(12) United States Patent
Prabhu et al.

(10) Patent No.: US 12,181,080 B2
(45) Date of Patent: Dec. 31, 2024

(54) PUSH-FIT PIPE FITTING WITH A VISUAL INDICATOR

(71) Applicant: PHILMAC PTY LTD, North Plympton (AU)

(72) Inventors: Raghunath Prabhu, North Plympton (AU); Stuart Watson, North Plympton (AU)

(73) Assignee: PHILMAC PTY LTD, North Plympton (AU)

( * ) Notice: Subject to any disclaimer, the term of this patent is extended or adjusted under 35 U.S.C. 154(b) by 0 days.

(21) Appl. No.: 18/295,968

(22) Filed: Apr. 5, 2023

(65) Prior Publication Data

US 2023/0323985 A1  Oct. 12, 2023

(30) Foreign Application Priority Data

Apr. 6, 2022  (AU) .................................. 2022202293

(51) Int. Cl.
*F16L 19/00* (2006.01)
*F16L 19/02* (2006.01)

(52) U.S. Cl.
CPC ......... *F16L 19/005* (2013.01); *F16L 19/0206* (2013.01); *F16L 2201/10* (2013.01)

(58) Field of Classification Search
CPC .. F16L 37/091; F16L 37/0925; F16L 2201/10
See application file for complete search history.

(56) References Cited

U.S. PATENT DOCUMENTS

| | | | |
|---|---|---|---|
| 10,072,783 B2 | 9/2018 | Gledhill et al. | |
| 2005/0035597 A1* | 2/2005 | Bamberger | F16L 37/0927 285/342 |
| 2013/0257036 A1* | 10/2013 | Guest | F16L 37/0925 285/332 |
| 2019/0390808 A1* | 12/2019 | Trotter | F16L 37/0985 |
| 2021/0301952 A1 | 9/2021 | Belen et al. | |

OTHER PUBLICATIONS

Examination Report 1, AU2022202293, IP Australia, Jun. 24, 2022.
Examination Report 2, AU2022202293, IP Australia, Jun. 27, 2022.
Examination Report 3, AU2022202293, IP Australia, Sep. 19, 2022.
Notice of Acceptance, AU2022202293, IP Australia, Dec. 16, 2022.

* cited by examiner

*Primary Examiner* — Aaron M Dunwoody
(74) *Attorney, Agent, or Firm* — Sand, Sebolt & Wernow Co., LPA

(57) ABSTRACT

A push-fit type fitting that can be used to connect a pipe to either another pipe or a variety of other fittings. The fitting includes a visual indicator that provides a visual confirmation to the user once the pipe has been correctly retained in the device.

15 Claims, 12 Drawing Sheets

PUSH-FIT PIPE FITTING WITH A VISUAL INDICATOR

FIELD OF THE INVENTION

The present invention relates to a push-fit pipe fitting with a visual indicator to inform the user once the pipe is correctly installed.

BACKGROUND ART

Liquid and gas networks are commonly comprised of a pressurized pipe network, wherein the pipes used in the networks can be connected using a variety of fitting types. A user will select a pipe connection fitting depending on the pipe diameter, pressure ratings, space requirements, and type of material.

The various types of connections that are used in industry, but not limited to, include flanged, push-fit, welding, electrofusion, gibbo joint, cam lock, threaded, and crimped connections.

Commonly in pipe networks the material influences the type of connection used. For example, mild steel cement lined pipes will be commonly connected via socket and joint push-in fittings, though previously it would be common for mild steel pipes to be welded together at the seams.

Fittings that are attached to pipes will be commonly fitted via a flanged end, for example, an air valve will be commonly attached to a pipe using a standard flange pattern.

High-density polyethylene pipes (HDPE) are commonly connected at the seams using electrofusion or electro welding, this involved cleaning the pipe ends, heating them and pushing them together until they cool and a joint is formed.

Gibbo joints are also used in the water network to connect two different material pipes. A gibbo joint is a push-in type fitting where two pipes are fed into a larger diameter steel cylinder with ring gaskets at either end, the pipes are then tightened in place by fasteners preventing the pipes to leave the gibbo joint under normal operating conditions.

Push-in or push-fit type fittings are recognisable by a fitting that has a central section where a pipe is fed over or into, and a compression system to retain the pipe during normal operating conditions.

Pressurised air networks commonly used push-fit type fittings, an example of this being a Festo fitting. Festo fittings have a central orifice where a pipe is pushed into, and as the pipe is pushed into the orifice it is retained by a set of teeth. The pipe can be removed from the fitting by pushing down on the fitting that releases the teeth gripping the pipe, the pipe can then be removed and exchanged accordingly.

Push-fit fittings though have several issues, the most common issue is when a pipe is inserted into the push lock fitting, the depth of the pipe is not visible and may result in the pipe only being partially inserted. When the pipe is pressurised, the pipe will pop out the fitting, or when a transient enters the network the pipe will burst out of the fitting.

Typically, where the user is unable to determine if the pipe has been correctly fitted into the fitting, the user would rely on pushing the pipe down into the fitting until they are unable to push further. If the pipe has not been pushed down deep enough the pipe can burst out the fitting when the pipe is pressurised. One method to mitigate this is by users marking the pipe to match the depth of the inner orifice of the push-fit fitting. When the user has inserted the pipe to the correct depth the marking will confirm the pipe is at the correct depth.

A key issue with push-fit fittings is the user is unable to determine when the pipe is correctly seated into the fitting and if the fitting has been correctly torqued down. If the push-fit fitting has not been correctly assembled, it may burst under operational conditions. The invention disclosed in this patent overcomes these issues by providing an indicator to the user once the pipe has been correctly seated.

SUMMARY OF THE INVENTION

In a first aspect of the invention there is proposed a push-fit pipe fitting comprising of a locking nut, compression fitting, locking ring, inner body, and main body.

In preference the push-fit pipe fitting comprises of a body member with at least one inlet wherein a pipe can be inserted when the push-fit pipe fitting it is fully assembled, and has an indicator to signal to the user when the pipe is correctly retained.

In preference the pipe fitting comprises of a locking ring.

In preference the locking ring comprises of teeth.

In preference the pipe can only be removed from the pipe fitting when it is disassembled.

In preference the pipe fitting can only be disassembled with a special tool.

In preference the indicator on the device is a visual indicator.

In preference the indicator on the pipe fitting is a physical indicator.

In preference the pipe fitting has at least one threaded end.

It should be noted that any one of the aspects mentioned above may include any of the features of any of the other aspects mentioned above and may include any of the features of any of the embodiments described below as appropriate.

The object of this invention is to provide a system and method to address the above shortcomings or at least provide the public with a useful alternative.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF THE INVENTION

Figure 1:
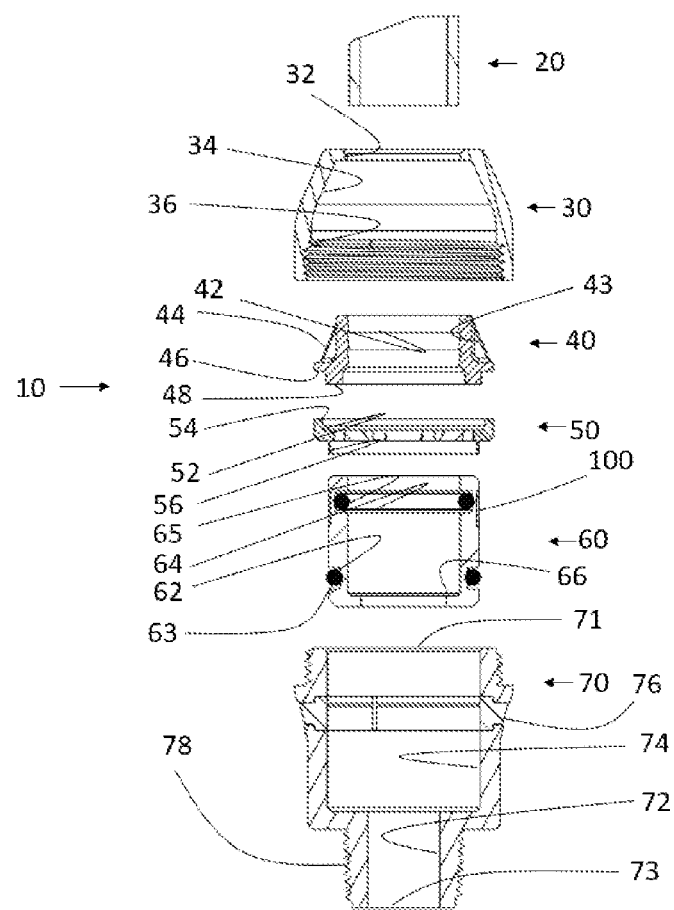
FIG. 1 is an expanded cross-sectional view of the push-fit fitting.

Referring now to the drawings in detail there is disclosed a push-fit fitting 10 with an indicator 100 comprising of a locking nut 30, compression fitting 40, locking ring 50, 51, inner body 60, 61, and a main body 70.

The size of the push-fit 10 devices is made to fit the size of pipe 20 that is required for it to be adapted to. The size of pipe 20 the push-fit fitting 10 can be used for can be but not limited to anywhere between 4 mm to 1000 mm.

Once the pipe 20 size has been selected, an appropriate size push-fit device 10 will be used.

Fully Assembled Pipe Install

Firstly, the inner body 60 is placed into the main body 70 by pushing it into the large body end 71.

Figure 5:
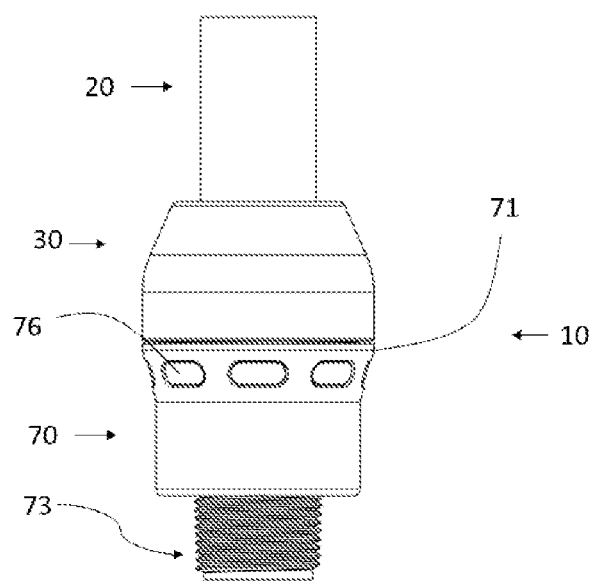
FIG. 5 is a fully constructed push-fit fitting.

The main body 70 is cylindrical in shape and has indicator windows 76 around the circumference as shown in FIG. 5.

The amount of indicator windows 76 can be between 1 to 30 windows, or comprise of one single window around the whole circumference.

The shape of the indicator windows 76 can be but not limited to a square, rectangle, triangle, or oval. Though one continuous indicator window 76 around the circumference of main body 70 can be used.

Figure 8:
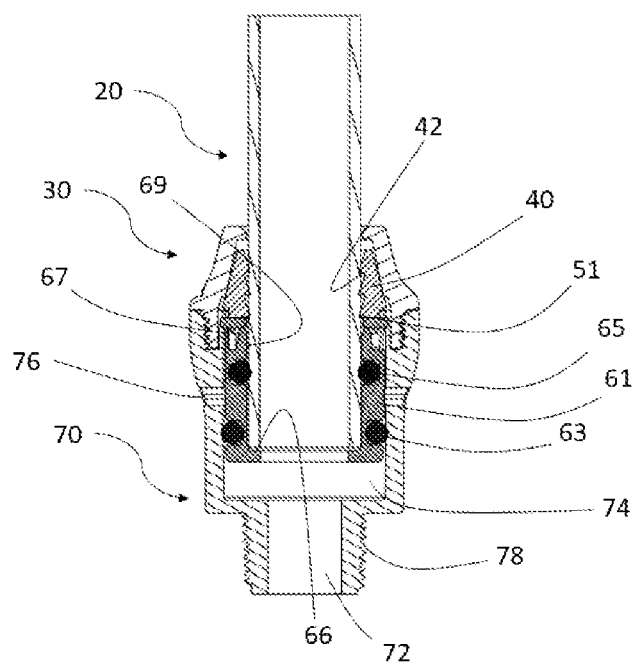
FIG. 8 is a cross-sectional view of a constructed push-fit fitting with a pipe partially installed.

The main body 70 has a threaded end 78 wherein fittings can be attached to. As shown in FIG. 8, the main body 70 has a threaded end 78 wherein fittings can be screwed onto. The size of the threaded end 78 can be but is not limited to 4 mm to 75 mm in diameter. The main body 70 can also include but is not limited to a flange, camlock, pushlock, or barbed end.

The inner body 61 comprises a ring of clips 67 at the top section. The clips 67 are small thin tabs of flexible material with a small ridge 68 on the outer top edge. An example of the clips 67 can be observed in FIG. 6.

As the inner body 61 is pushed into the main body 70 the clips 67 on the inner body 61 clip in underneath the inner body ridge 75 on the main body. This prevents the inner body 61 from being removed easily from the main body 70. As example of it being inserted can be observed in FIG. 6.

The inner body 61 comprises of an outer O-ring 63 that is squeeze between the inner surface of the main body 70 and the outer O-ring grove 62.

The inner body 61 comprises of an inner O-ring 65. The inner O-ring 65 is used to form a seal with the outer surface of the pipe 20 when it is inserted. A seal is formed by the O-ring 65 squeezing between the outer surface of the pipe 20 and the inner O-ring grove 64.

The inner body 61 has an indicator 100 located on the outer surface. The indicator 100 can be observed around the full outer circumference of the inner body 61. The indicator 100 can be but is not limited to a colour, word, or symbol. The indicator 100 is positioned on the outer surface of the body 61 to ensure that it will only appear through the indicator windows 76 when the pipe is inserted or retained in the device 10. The indicator 100 can be but is not limited to a progression of colours that provides a signal to the user based on the depth of insertion, or one solid colour. For example, this can be a colour going from red to orange and finally green upon final installation. It should be noted that the indicator 100 is not limited to be found on the main body 60, 61 and can be located on any component that can provide a signal to the user as the pipe is inserted and retained.

Alternatively, a physical signal can also be used instead of a visual indicator 76, this can be in the form of a tab that is raised or shifts as the pipe is inserted into the device 100.

Figure 6:
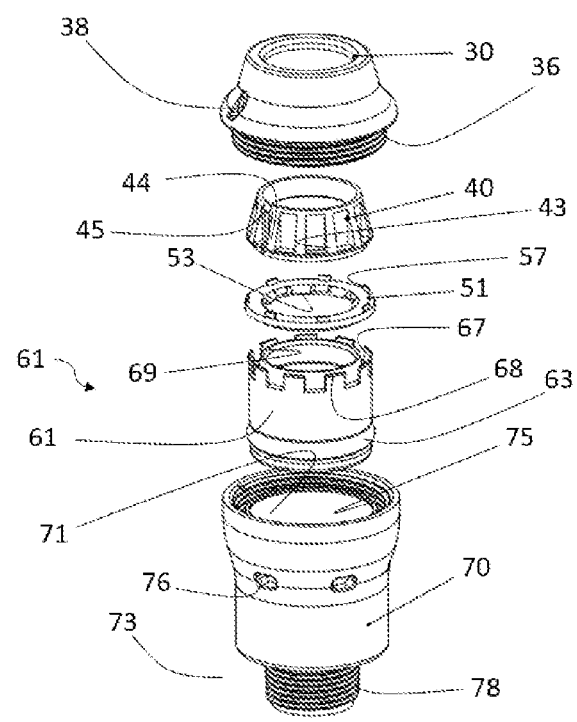
FIG. 6 is an expanded isometric view of the push-fit fitting with a locking ring with teeth and an inner body with clips.

The inner body 61 includes an inner ring protrusion 69 that is found on the top of the inner body 61, an example can be observed in FIG. 6. The inner ring protrusion 69 is used to align the pipe 20 as it is inserted into the fully assembled device 10.

Alternatively, an inner body 61 with no clips can be used 60 instead of an inner body with clips 61. FIG. 1 displays an inner body 60 that does not include clips.

Once the inner body 61 has been placed into the main body 70, the locking ring 51 is placed onto the inner body 61 with the alignment teeth 57 facing upwards. An example of the alignment of the locking ring 51 can be observed in FIG. 6.

The locking ring 51 includes a set of inner teeth 53 that protrude outwards from the inner wall of the locking ring 51 a few millimetres. The number of teeth 53 the locking ring 51 may include can be but not limited to one tooth that is the full circumference of the locking ring 51, up to 50 individual teeth.

The alignment tabs 57 on the locking ring 51 are small tabs that protrude upwards a few millimetres from the upper surface 54 of the locking ring 51. The distance the alignment tabs 57 protrude from the locking ring teeth 53 can be but not limited to a few millimetres.

Alternatively other forms of locking rings 51 can be used such as an inner barb wherein the pipes 20 inner surface is pushed over and forms a seal that locks it in place.

The compressing fitting 40 is then placed on top of the locking ring 50, the compressing fitting 40 is held in place by the alignment teeth 57. An example can be observed in FIG. 7 wherein the alignment tabs 57 sit on the outside surface of the compression ring 40.

The compression fitting 40 is a tapered fitting that matches the internal taper 44 of the locking nut 30. The compressing fitting 40 comprises of ridges 43 that travel from the top edge of the compression fitting 40 to the bottom. There is a longitudinal slit 45 on the compression fitting 40 that allows the compression fitting 40 to expand and contract. The slit 45 allows the compression fitting 40 to expand as the pipe 20 is inserted and can compensate for any pipe wall thickness discrepancies.

The compression fitting 40 comprises of inner teeth 42 that allow a pipe to be inserted easily in one direction but prevents it from being pulled in the opposite direction. An example of the teeth 42 can be observed in FIG. 7. The compression fitting 40 can comprise of but is not limited to one tooth that would cover the whole circumference, to 30 teeth.

The locking nut 30 is then placed over of the compression fitting 40, this is then rotated and tightened into the main body 70. As the locking nut 30 is rotated the hollow chamber 34 of the locking nut 30 tightens and retains the compression fitting 40.

Figure 2:
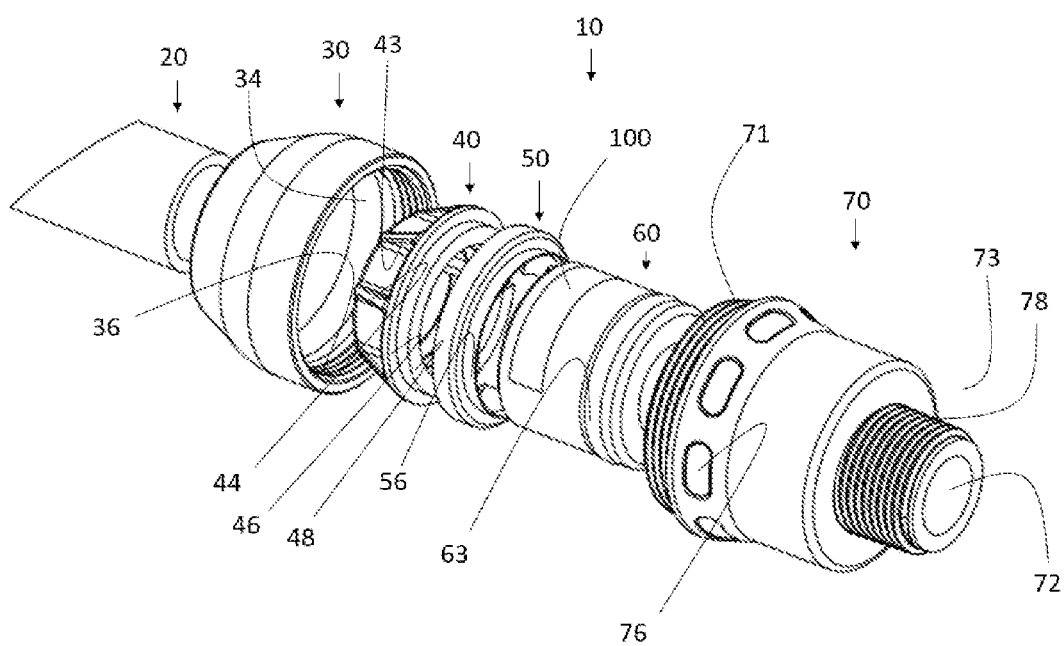
FIG. 2 is an expanded isometric view of the push-fit fitting.
Figure 3:
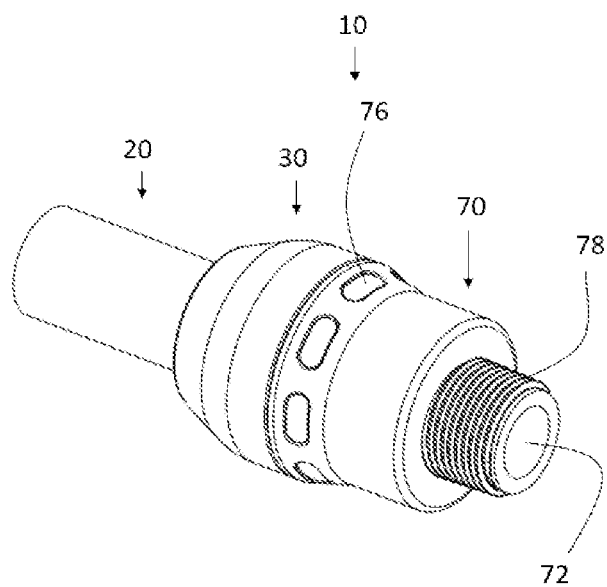
FIG. 3 is an isometric view of the push-fit fitting completely assembled.

The locking nut 30 shape is a tapered cylinder as shown in FIG. 6. A male or female threaded 36 section is found on the lower half of the locking nut 30, this threaded section 36 threads into the main body 70. The threaded section 36 on the locking nut 30 can be a female or male thread. For example FIG. 2 shows an arrangement of a main body 70 with a male threaded section, and a locking nut 30 with a female threaded section, while FIG. 12 displays a main body 70 with a female threaded section and a locking nut 30 with a male threaded section.

Figure 10:
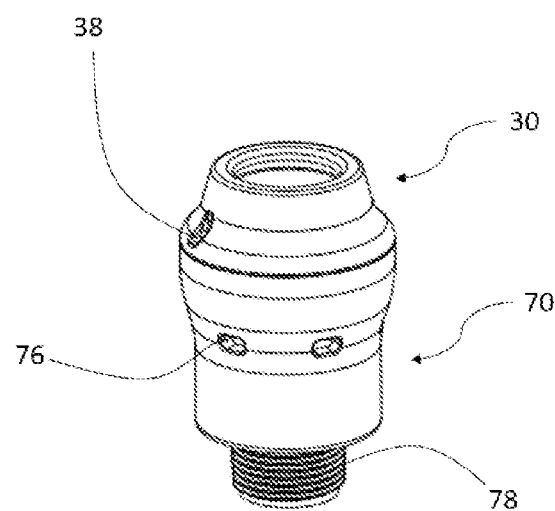
FIG. 10 is an isometric view of a fully constructed push-fit fitting.
Figure 11:
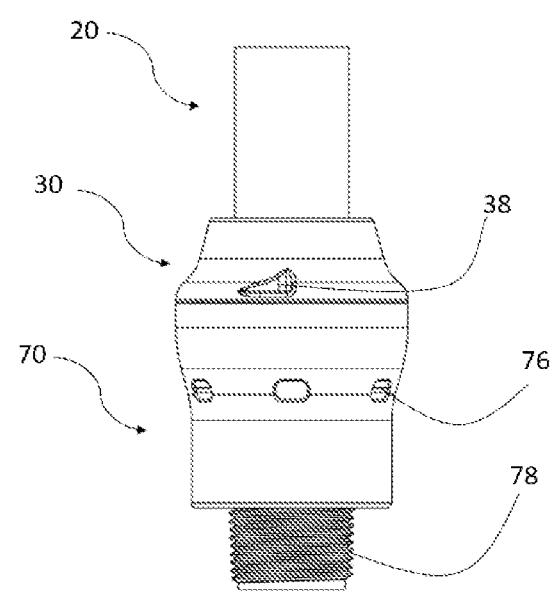
FIG. 11 is a side view of a fully constructed push-fit fitting.
Figure 12:
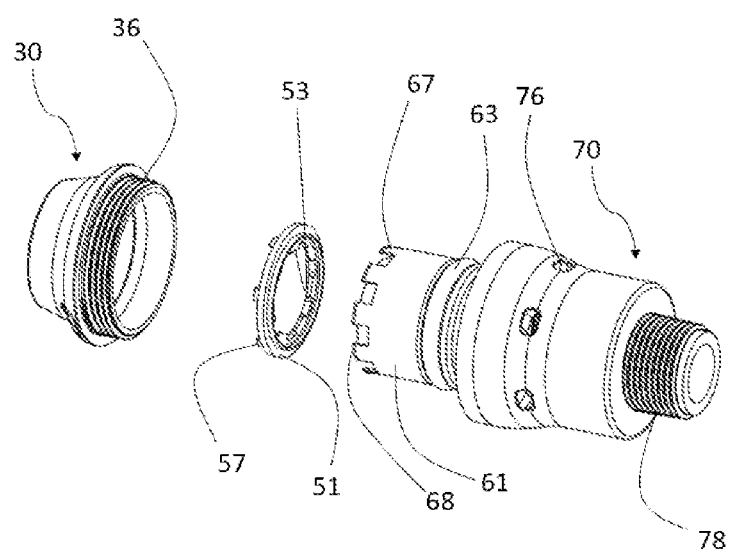
FIG. 12 is an expanded isometric view of the push-fit fitting.

The outer surface of the locking nut 30 can be but is not be limited to a smooth surface with no flat edges, or a flat surface that can allow tools to grip. A smooth surface locking nut as shown in FIG. 12 prevents a flat edged wherein tools can grip onto and undo the locking nut. The locking nut comprises of a small recess 38 were in a special tool can grip into and un-do the locking nut 30. An example of the small recess 38 can be observed in FIG. 10 and FIG. 11. FIG. 10 displays an oval shape tool slot 38, wherein FIG. 11 is a teardrop shape. The special tool slot 38 can but is not limited to an oval shape, teardrop, square, triangle, hexagon, circle, or star. The amount of tools slots 38 can be but not limited to 1 to 30. The location of the tool slots 38 can be located not only on the locking nut 30 but also on the main body 70.

A pipe 20 can also be installed into the device 10 after it is fully assembled without the pipe 20. It would be expected that the end customer would receive the product in the fully assembled configuration, though the customer can also receive the device unassembled.

Figure 7:
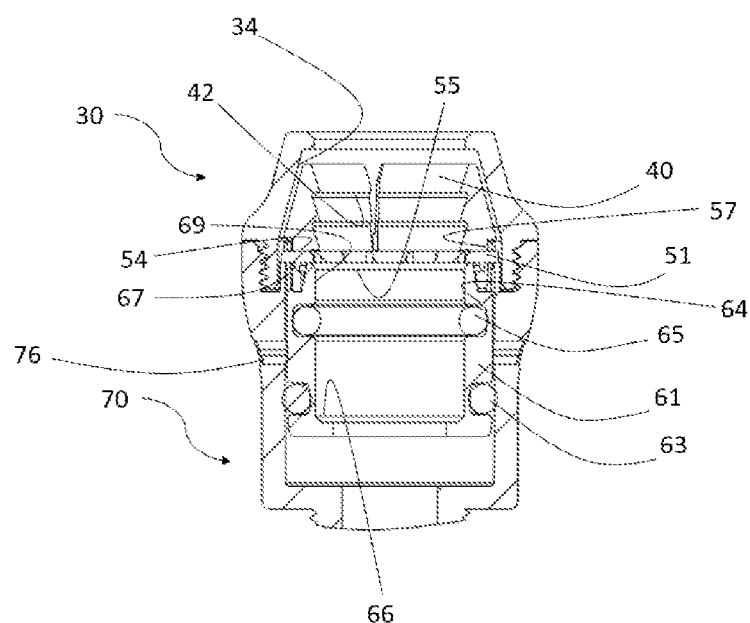
FIG. 7 is a constructed push-fit fitting cross-sectional view.
Figure 9:
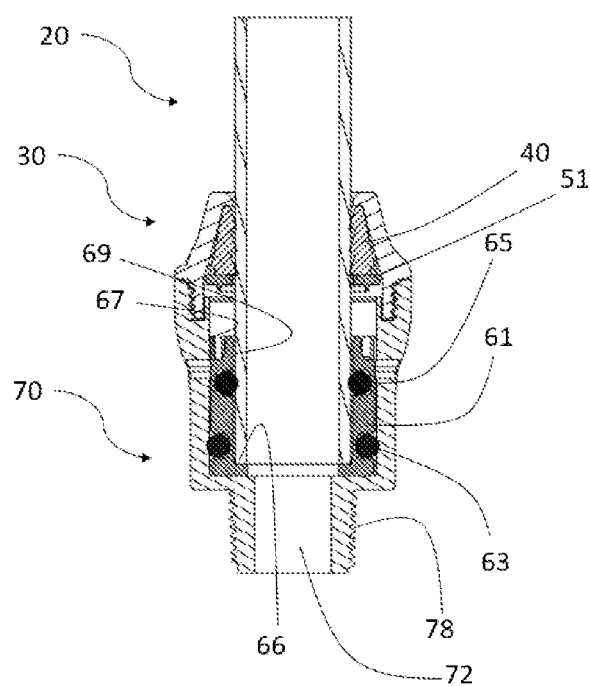
FIG. 9 is a cross-sectional view of a constructed push-fit fitting with a pipe fully installed.

The device 10 is firstly fully assembled without the pipe as shown in FIG. 7 and FIG. 10. All the components 30, 40, 50, 60, 70, 100 are used in the assembly. Alternatively, it can be the device can also be constructed using an inner locking ring with teeth 51 and an inner body with clips 61 as shown in FIG. 7, FIG. 8, and FIG. 9. After the device 10 is assembled the top of the inner body 61 is against the bottom of the locking ring 51 as shown in FIG. 7.

A pipe 20 is then pushed in through the locking nut 30, through the compression fitting 40, through the locking ring 51, and then into the inner body 61 until the end of the pipe 20 abuts against the inner body ledge 66, an example shown in FIG. 8.

As the pipe is pushed into the inner body, the inner O-ring 65 is squeezed against the surface of the pipe 20 and the inner O-ring groove 64 forming a seal between the pipe 20 and inner body 61. An example of this can be observed in FIG. 8.

The teeth 42, 53 on the compression fitting 40 and locking ring 51 will also form an interference fit with the pipes 20 outer surface. The teeth 42, 53 allow the pipe 20 to be pushed in easily, though make it difficult for the pipe 20 to be removed while it is fully assembled.

Figure 4:
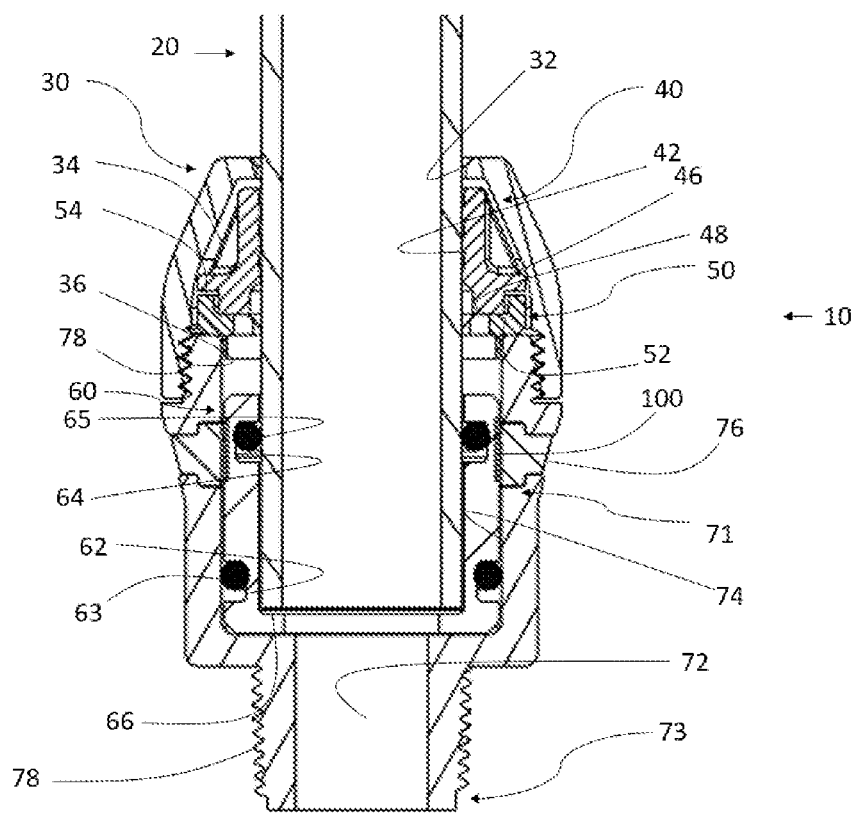
FIG. 4 illustrates the constructed cross-section of the push-fit fitting.

The user will continue to push the pipe 20 into the device 10, as the user pushes the pipe 20 further into the device 10 after the pipe 20 has abutted against the inner body ledge 66 it will force the inner body 60 further into the main body port 74. The user will be able to see the indicator 100 from the indicator window 76 once the pipe 20 is pushed to the correct depth as shown in FIG. 4 and FIG. 9.

As the inner body with clips 61 is pushed further into the body 70, the ridge 68 on the clips 67 will clip in under the ridge 75 on the inner surface of the main body 70. This locks the inner body 61 with teeth into main body 70 preventing it from moving above the inner body ridge 75.

Once the pipe 20 has pushed the inner body 61 into the main body port 74 to the correct depth the indicator 100 will be visible from the indicator window 76, the installation of the pipe 20 into the device 10 is complete and can be used. If the pipe is partially installed, the indicator will be partially visible. Though it is noted that the indicator 100 can vary in accordance with what the user selects, for example, if it is a progressive indicator 100, a visual indicator 100 from the indicator window 76 will be observed to change colours until the desired pipe 20 depth is achieved.

The pipe 20 cannot be easily removed from the device 10 by pulling it while it is fully assembled.

To remove the pipe 20 the locking nut 30 needs to be undone. A special tool (not shown) is required for this. The special tool locks into the tool slots 38 on the nut 30, this allows the user to rotate the nut 30 and undo it from the body 70. Once the nut 30 is undone, it allows the user to remove the pipe from the body 70.

The tool slot 38 is a recess in the locking nut 30 that allows a special tool to be inserted into and grip. The recess of the tool slot 38 can be any shape and at a depth that does not penetrate the inner surface of the nut 30. The shape of the tool slot 38 can be but is not limited to a rectangle, square, triangle, star, hexagon, or oval.

The number of tools slots 38 on the nut can be but not limited to one to thirty tool slots.

Once the device 10 is constructed, water can communicate from the pipe to the port 72 in the main body.

Individual Component Assembly

Firstly, the pipe 20 of the desired size is pushed through the locking nut 30 outer end 32 so the inner threads 36 of the locking nut 30 are pointing towards the end of the pipe 20. An example of how the locking nut 30 is pushed over the pipe is shown in FIG. 1.

A locking nut 30 is cylindrical with a hollow chamber 34.

The hollow chamber 34 has an internally threaded section 36, and an upper tapered section 34 that converges inwardly from the inner threaded section 36 down to the outer end 32.

The outer surface shape of the locking nut 30 can be made into various shapes to match the users' requirements, as an example but not limited to in FIG. 1 the outer surface of the locking nut 30 tracks the diameter of the inner surface.

The outer surface of the locking nut 30 can also include a flat surface that can allow tools to be applied to it, for example, but not limited to a hexagonal pattern. The surface of the locking nut can also be embossed or ribbed which can allow users a better grip when the outer surface is wet.

The locking nut outer end orifice 32 is a few millimetres larger than the outer diameter of the pipe 20 allowing the pipe 20 to easily pass through.

After the locking nut 30 engages pipe 20, the pipe 20 is then fed through a compression fitting 40.

The compression fitting 40 has an inner surface that has teeth 42 around the full inner circumference. The teeth 42 allow the pipe 20 to be fed in easily one direction, though when the pipe is pulled in the opposite direction the teeth 42 grip the pipe wall locking the pipe in place.

The number of teeth 42 inside the compression fitting 40 can vary in number, as an example but is not limited to it can include one to 30 teeth. An example is shown in FIG. 1 wherein the compression fitting 40 displays three teeth 42 around the full inner circumference.

The teeth 42 can also vary in design, for example, but not limited to, a on tooth 42 that covers the whole circumference or smaller individual teeth 42 around the circumference. Other types of projections can be used instead of teeth such as a round ring that slots into a collocated hole on the pipe.

The outer shape of the compression fitting 40 correspondingly fits in the locking nut 30 taper hollow section 34. The compression fitting 40 has a tapered outer surface 44 that is slightly larger than the inner diameter of the locking nut hollow chamber 34. A purpose the tapered outer surface 44 serves is that when the locking nut 30 is torqued down it squeezes the compressing fitting 40 down into the rest of the push-fit 10 body.

The compression fitting 40 has a flange 46 as shown in FIG. 1.

The flange 46 is a lip that protrudes outwards to match the same outer diameter of the locking ring 50.

The thickness of the flanged end 46 is a few millimetres, though this can vary in thickness depending on the user requirements.

The flanged end 46 has a small male end 48 that protrudes out and has an inner diameter that allows the pipe to easily move through. The outer diameter of the male end 48 is close to the inner diameter of the female locking ring 52.

The male end 48 of the compression fitting is made to be inserted into the locking ring female end 52. When the male end 48 of the compression fitting is inserted into the female end 52 of the locking ring 50 the flanged end will stop on the locking ring 50 upper surface 54.

The pipe is then fed through the locking ring 50, 51 after the compression fitting 40, ensuring the female end 52 is facing the compression fitting 40.

The locking ring 50, 51 is circular, though it is not limited to this shape and can also be in the form of a C-shaped ring. There are two forms of locking rings 50, 51.

The first type of locking ring 50 can be observed in FIG. 1 and FIG. 2. The locking ring 50 has a male end 56 opposite a female end 52. The male end 56 of the locking ring is a short extrusion that has an inner diameter that will allow the pipe to easily travel through, and an outer diameter that is closely matched to the hollow section of the main body 70.

The second type of locking ring 51 can be observed in FIG. 6. This second type of locking ring 51 comprises of teeth 53 on the inner surface that are in contact with the ring. The teeth 53 are spread around the whole inner diameter of the locking ring 51, the number of teeth 53 can be but not limited to one to 20 teeth. The second type of locking ring 51 also include teeth 57 that protrudes upwards on the upper surface of the locking ring 53. The upward protruding teeth 57 forms an interference fit with the compressing fitting male end 48.

After the locking ring 50 is threaded over the pipe 20, the pipe 20 is threaded through the inner body 60.

The inner body 60, 61 is cylindrical and is hollow in the centre, the hollow centre is large enough to allow the pipe 20 to enter into it. One end of the inner body 60 has a larger orifice where the pipe 20 is fed into. As the pipe 20 is fed into the inner body, it is pushed into the inner body 60 until the end of the pipe 20 firmly abuts the inner body's inner surface 66.

The inner body 60 can also come in a variant 61 that has clips 67 protruding upwards around the outer circumference of the inner body 61 (FIG. 6). The number of clips 67 protruding upwards can be but not limited to one to thirty teeth. The clip 67 has a ridge 68 at the top of each of the clips 67 on the outer surface. The clips 67 are flexible, when pressure is placed on the clips 67 they will flex. Once the pressure is released, the clips 67 will return to their original position. The ridge 68 on the teeth is made to clip under the inner surface ridge 75 on the body 70 (FIG. 6) when the pipe is being inserted.

The inner body's inner ledge 66 is a smaller diameter section of the inner body 60, 61 as shown in FIG. 1 and FIG. 4. The diameter of the inner body's surface is no less than the inner diameter of the chosen size of the pipe 20, to ensure there is no restriction of fluid flow.

The inner ledge 66 of the body is located at the opposite end the pipe 20 is inserted into.

The thickness of the inner ledge 66 is dependent on the operating pressure the push-fit 10 will be subject to, higher pressures will require a thicker ledge 66.

The inner body has 60, 61 has an outer grove 62 for an outer O-ring 63 to be accommodated. The inner body 60, 61 further includes a grove 64 on the inner wall to accommodate an O-ring 65. The O-rings 63, 65 prevent fluid from passing through the inner body 60 and then through the main body 70, this is achieved since the O-rings 63, 65 compress between the inner surface of the body 70 and O-ring grove 62, 64.

As the pipe is further inserted into the inner body 60, the inner O-ring 65 is compressed into the inner grove 64. As the inner O-ring 65 is compressed into the inner grove 64 it forms a seal between the pipes 20 outer surface and inner body 60.

On the outer surface of the inner body 60, 61 an indicator 100 is present in the form of a colour. As shown in FIG. 1 and FIG. 2, the indicator can be in the form of a colour that is along the outer circumference of the inner body 60, 61, though other forms of visual indicators can be used such as words, symbols, or any other visual image. It is thus to be made clear that a colour is not an essential feature of the present invention.

After the pipe 20 is inserted into the inner body 60, 61, the pipe 20 along with the inner body 60, 61 is inserted into the larger hollow section 74 of the main body 70 of the push-fit device 10.

The main body 70 outer surface is preferably cylindrical and can include flat surfaces for tools to be applied to for gripping if required.

The main body 70 has two ends, a larger end 71 and a smaller end 73, though it is not limited to this and can have various types of ends to accommodate other fittings. The larger end 71 inner diameter is to accommodate the inner body components 60, 61 and the locking ring male end 56. The inner diameter of the main body's 70 larger section 71 is close to the diameter of the locking ring male end 56, to ensure that when the push-fit device 10 is fully assembled the locking ring male end 56 is compressed and held against the main body 70 larger section 71.

The larger end 71 of the outer body includes external threads 78 on the outer surface, the threads 78 adapted to be engaged by female threads 36 on the locking nut 30. The main body 70 is not limited to a male thread, as shown in FIG. 6 the main body 70 can also include a female thread that would receive a male thread from the locking nut 30.

The smaller end 73 of the main body 70 has an inner diameter that matches the chosen pipe inner diameter, this ensures there is little to no disruption to the fluid flow.

The outer surface of the smaller section 73 can be adapted to fit other types of fittings, as an example but not limited to, FIG. 1 and FIG. 6 displays a male threaded 78 fittings that can be used to screw onto other parts. Other forms of fittings that can be adapted onto the end of the main body 70 but not limited to are another large end 78 that can accept the same or different size pipes, cam lock fitting, barb, push-in, valve, and a flange.

As the inner body 60 is pushed into the main body 70, the outer O-ring 63 is squeezed into the outer O-ring groove 62. As the outer O-ring 63 is compressed into the outer grove 62 it forms a seal.

Once the inner body 60 is pushed into the larger hollow section of the main body 70, the locking nut 30 is pulled towards the body 70 and the inner threads 36 of the locking nut 30 are threaded onto the outer body threads 78.

As the locking nut 30 is threaded onto the body 70 it compresses all the push-fit components 20, 30, 40, 50, 60, 70 together via an interference fit. As the locking nut 30 is rotated the inner body 60 is pushed further into the hollow section of the main body 74. The user can determine when the locking nut 30 is at its final position when the indicator 100 on the inner body 50 is visible through the indicator window 76 on the main body.

As the locking nut 30 is threaded onto the main body 70, the taper of the locking nut hollow centre 34 pushes the compression fitting 40 into the locking ring 50. As the compression fitting is pushed into the locking ring 50, the compression fitting male end 48 is pushed firmly into the locking ring female end 52. This then pushes the locking right male end 56 into the main body larger hollow section 74, which also pushes the inner body further into the main body 70.

As the inner body 60 is pushed further into the main body 70 by tightening the locking nut 30 onto the main body 70, the indicator 100 will align up with the indicator window. The indicator 100 will be fully visible through indicator window 76 when the locking nut 30 has been correctly torqued down.

If the locking nut 30 has not been correctly torqued down onto the main body 70, the indicator 100 on the inner body 60 will not be visible through the indicator window 76. For example, if the user has only partially torqued down the locking nut 30, the indicator 100 will only be partially visible through the indicator windows 76. This signifies to the user that they will need to continue to rotate the locking nut 30 further until the indicator 100 is fully visible through the indicator window 76 confirming the push-fit 10 fitting has been correctly assembled.

The main body 70 has an indicator window 76 that allows the user to view the indicator 100 on the inner body 60 as it is inserted. An example of how an indicator window may look is shown in FIG. 1. The indicator windows 76 shown in FIG. 1 may include small windows around the circumference of the body. Other options of indicator windows that could be used but not limited to is having a single indicator window around the whole circumference or a single smaller window. The indicator window can also be located in any of the push-fit components that have an outer surface that is visible when fully assembled.

The indicator 100 allows the user to currently identify when the pipe is in its correct position in the fitting.

Other forms of indicators 100 can also be used such as a physical indicator that changes its visual indicia when the pipe is in its correct position. For example, when the pipe is correctly assembled a tab will emerge from the surface.

When the user disassembles the push-fit device 10, they first undo the locking nut 30, once the locking nut 30 is undone the compression fitting 40, locking ring 50, the inner body 60, and the main body 70 remain tight on the pipe since the compression fitting 40, locking ring 50, and main body 70 were pressed fit together when the locking nut 30 was tightened.

The compression fitting 40, locking ring 50, and the main body 70 can be separated by inserting a flat tool in between each of the components 40, 50, 70 and forcing the components away from each other. This can also assist the user as a form of security or safety means to prevent the pipe from being easily removed. If the locking nut 30 is undone the pipe 20 will still be held firmly in place unless the individual components are separated using a tool.

Once the components 40, 50, 70 are separated from each other they can be removed from the pipe 20.

The push-fit device 10 can be reused and assembled.

LIST OF COMPONENTS

The drawings include the following integers.
10—Push-lock device
20—Pipe
30—Locking nuts
32—Locking outer end
34—Locking nut hollow chamber
36—Locking nut inner threads
38—Tool slot
40—Compression fitting
42—Compress fitting inner barb
43—Compression fitting ridges
44—Compression fitting taper
45—Compression fitting slit
46—Compression fitting flanged end
48—Compression fitting male end
50—Locking ring
51—Locking ring with teeth
52—Locking ring female end
53—Locking teeth
54—Locking ring upper surface
56—Locking ring male end
57—Alignment teeth
60—Inner body
61—Inner body with teeth
62—Outer grove
63—Outer O-ring
64—Inner grove
65—Inner O-ring
66—Inner body ledge
67—Clips
68—Clips ridge
69—Inner ring protrusion
70—Body
71—Larger body end
72—Receiving port
73—Smaller body end
74—Main Body port
75—Inner ridge
76—Indicator window
78—Outer threads
100—Indicator Further advantages and improvements may very well be made to the present invention without deviating from its scope. Although the invention has been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

The invention claimed is:
1. A pipe fitting system, comprising:
a pipe fitting with an inner body, an outer body, and a pipe;

the outer body comprising a plurality of transparent windows and a receiving end configured to receive the inner body;

the inner body comprising a visual indicator and an inlet configured to receive an end of the pipe;

wherein the pipe and the inner body are advanced into the outer body when the pipe end is inserted into the inner body inlet;

wherein the visual indicator is visible through the plurality of transparent windows when the pipe is correctly installed in the pipe fitting;

wherein the pipe is insertable into the pipe fitting when the pipe fitting is in a fully assembled state;

a locking nut having a threaded end;

wherein the receiving end of the outer body comprises a threaded surface;

wherein the locking nut is threaded onto the receiving end of the outer body; and wherein the inner body is enclosed when the locking nut is threaded onto the outer body.

2. The pipe fitting system of claim 1, further comprising a connection means between the inner body and the outer body;

wherein the inner body comprises a plurality of protruding clips configured to engage a raised surface on an interior of the outer body; and wherein the connection means prevents the inner body from being withdrawn from the outer body.

3. The pipe fitting system of claim 1, wherein the visual indicator is only observable when the pipe is correctly installed in the pipe fitting and the connection means between the inner body and the outer body is engaged.

4. The pipe fitting system of claim 1, wherein the inner body is advanced along the inner body by threading the locking nut onto the outer body.

5. A pipe fitting, comprising:
an inner body comprising a visual indicator and a plurality of protruding clips;
an outer body comprising a plurality of transparent windows and a receiving end configured to receive the inner body, wherein the receiving end includes a threaded surface;
a locking nut configured to engage the threaded surface of the receiving end of the outer body;
wherein the inner body is advanced into the outer body as the locking nut is screwed onto the outer body;
wherein the inner body is fully enclosed when the locking nut is fully engaged with the outer body; and
wherein the visual indicator is observable through the plurality of transparent windows when the locking nut is fully engaged with the outer body.

6. The pipe fitting of claim 5, wherein the outer body comprises a raised surface configured to receive the plurality of clips of the inner body; and wherein the visual indicator is only observable when the locking nut is fully engaged with the outer body and the plurality of clips of the inner body is engaged with the raised surface of the outer body.

7. The pipe fitting of claim 5, wherein the inner body includes an inlet configured to receive an end of a pipe.

8. The pipe fitting of claim 7, wherein the inner body includes an inner ring protrusion configured to align the pipe as the pipe is inserted into the inner body.

9. The pipe fitting of claim 5, further comprising a compression fitting.

10. The pipe fitting of claim 9, wherein the compression fitting is tapered.

11. The pipe fitting of claim 9, wherein the compression fitting includes longitudinal slits.

12. A method of verifying if a pipe is correctly installed in a pipe fitting, said method comprising:
providing the pipe fitting comprising an inner body and an outer body;
providing the inner body with a visual indicator, an inlet configured to receive an end of a pipe, and a plurality of protruding clips;
providing the outer body with a plurality of transparent windows, a receiving end configured to receive the inner body, and a raised surface configured to engage the inner body protruding clips;
inserting the end of the pipe into the inner body inlet;
advancing the inner body and pipe into the outer body;
wherein upon the inner body protruding clips reaching the outer body raised surface, observing the visual indicator through the plurality of windows to ensure that the pipe is correctly installed.

13. The method of claim 12, further comprising providing the pipe fitting with a locking ring and inserting the pipe end through the locking ring and into the inner body inlet.

14. The method of claim 13, further comprising providing a compression fitting on the pipe fitting and inserting the pipe end through the compression fitting, then through the locking ring and into the inner body inlet.

15. The method of claim 13, further comprising a locking nut on the pipe fitting and inserting the pipe end being through the locking nut, then through the compression fitting, and then through the locking ring and into the inner body inlet.

* * * * *